United States Patent [19]
Namiki et al.

[11] Patent Number: 5,654,356
[45] Date of Patent: Aug. 5, 1997

[54] FLAME RETARDANT POLYOLEFIN COMPOUND HAVING LOW SMOKING AND TOXICITY

[75] Inventors: Yukihiko Namiki, Kawasaki; Yasushi Kato, Nara; Yasunori Kitano, Ako; Hirofumi Kurisu, Ako; Toshikazu Kotani, Ako; Yoshiaki Yokota, Ako, all of Japan

[73] Assignee: Tateho Chemical Industries Co., Ltd., Ako, Japan

[21] Appl. No.: 681,406

[22] Filed: Jul. 23, 1996

[51] Int. Cl.⁶ ............................................ C08K 3/22
[52] U.S. Cl. ..................... 524/413; 524/436; 524/496
[58] Field of Search ........................... 524/496, 413, 524/436; 523/179

[56] References Cited

U.S. PATENT DOCUMENTS

| | | | |
|---|---|---|---|
| 4,405,425 | 9/1983 | Schiller et al. | 524/496 |
| 4,464,497 | 8/1984 | Belfoure | 524/496 |
| 4,694,030 | 9/1987 | Bonin et al. | 523/179 |
| 5,096,633 | 3/1992 | Yoshida | 524/496 |
| 5,232,976 | 8/1993 | Horacek et al. | 524/496 |
| 5,258,216 | 11/1993 | Bonin et al. | 523/179 |
| 5,344,636 | 9/1994 | Miyata | 524/436 |
| 5,397,643 | 3/1995 | Bonin et al. | 523/179 |
| 5,430,081 | 7/1995 | Ohmae et al. | 524/436 |
| 5,480,929 | 1/1996 | Miyata | 524/413 |
| 5,583,172 | 12/1996 | Imahashi et al. | 524/435 |

FOREIGN PATENT DOCUMENTS

| | | | |
|---|---|---|---|
| 0498566A | 8/1992 | European Pat. Off. | |
| 59-184237 | 10/1984 | Japan | 524/436 |
| 2163167 | 2/1986 | United Kingdom | |

*Primary Examiner*—Veronica P. Hoke
*Attorney, Agent, or Firm*—Oblon, Spivak, McClelland, Maier & Neustadt, P.C.

[57] ABSTRACT

A flame retardant polyolefin composition comprising polofin resin and a flame-retarding component which is prepared by adding 1 to 20 parts by weight of fine carbon powder to 100 parts by weight of composite metal hydroxide expressed by the general formula $Mg_{1-x}M^{+2}{}_x(OH)_2$ in which $M^{+2}$ is at least one element selected from the group consisting of bivalent metallic ions $Mn^{+2}$, $Fe^{+2}$, $Co^{+2}$, $Ni^{+2}$, $Cu^{+2}$ and $Zn^{+2}$, and x has a value satisfying $0.001 \leq x \leq 0.9$.

9 Claims, No Drawings

FLAME RETARDANT POLYOLEFIN COMPOUND HAVING LOW SMOKING AND TOXICITY

BACKGROUND OF THE INVENTION

1. Field of the Invention

The invention relates to a flame retardant polyolefin compound having low smoking and toxicity, and particularly to a low smoking and flame retardant material to be used as electric wire and cable covering materials or various electric part materials.

2. Description of the Related Art

Since polyolefin resins are generally flexible, excellent in electrical insulating properties, and cheaper than other materials, they have been used extensively as electric wire covering materials and various electric part materials. But, because of the past serious fires, the electric wire covering materials and various electric part materials are increasingly demanded to be flame-retardant, and such demands are becoming rigorous.

In response to such demands, a flame retardant using an organic halogen compound and antimony trioxide has been proposed and used. But, a flame-retarding material used in such a combination is partly decomposed to produce halogen gas in its production process, corroding its processing machine and molding machine, and also exerting toxicity to workers.

Besides, there is a disadvantage of producing a large quantity of smoke containing toxic gas in case of fire. Therefore, in view of safety in production and use, demands for non-halogen-based flame retardants have increased, and metal hydroxides are attracting attention.

But, aluminum hydroxide representative of the metal hydroxides starts to dehydrate at about 190° C., causing a problem of bubbling in a molded article. Therefore, it has a disadvantage that its applicable resins are limited.

On the other hand, magnesium hydroxide decomposes at a high temperature and its applicable resins are substantially not limited, and it is now being used as a non-halogen-based flame retardant compound material for electric wire covering materials and various electric part materials.

However, since the polyolefin resin is generally flammable, and to make it flame retardant, it is required to add a large quantity of magnesium hydroxide, resulting in causing practical disadvantages that the intrinsic properties of the resin are deteriorated, and mechanical properties and processability are extremely deteriorated.

In order to remedy such disadvantages, it was tried to add a flame-retarding aids such as red phosphorus or fine carbon powder to a halogen-free polyolefin-based resin material to reduce the addition of hydroxide as low as possible. But, there were disadvantages that red phosphorus must be handled carefully when processing, and when fine carbon powder is added in a small amount to meet the mechanical properties, its effect as the flame-retarding aid is not attained.

SUMMARY OF THE INVENTION

The present invention has been completed in view of the above disadvantages, and aims to provide a flame retardant polyolefin-based compound which is suitable for electric wire covering materials and electric part materials by decreasing than the addition of a conventional flame-retarding material, particularly hydroxide, as low as possible to a halogen-free polyolefin-based resin material.

The inventors have made a devoted study and found that by using composite metal hydroxide and fine carbon powder in combination as a flame retardant, the addition of the flame retardant component to the polyolefin resin can be decreased extremely, and a flame retardant polyolefin compound which secures required flame retardancy and satisfies mechanical properties can be attained.

Specifically, a flame retardant polyolefin compound having low smoking and toxicity according to the invention comprises 100 parts by weight of polyolefin resin and 60 to 150 parts by weight of a flame retardant component which is prepared by adding 1 to 20 parts by weight of fine carbon powder to 100 parts by weight of composite metal hydroxide expressed by the following general formula (1):

$$Mg_{1-x}M^{+2}_{x}(OH)_2 \tag{1}$$

in which $M^{+2}$ is at least one element selected from the group consisting of bivalent metallic ions $Mn^{+2}$, $Fe^{+2}$, $Co^{+2}$, $Ni^{+2}$, $Cu^{+2}$ and $Zn^{+2}$, and x has a value satisfying $0.001 \leq x \leq 0.9$.

The polyolefin resin is at least one member selected from the group consisting of polyethylene, polypropylene, ethylene-ethyl acrylate copolymer and ethylene-vinyl acetate copolymer, and a copolymer thereof. But, polyethylene is particularly suitable in view of flame retardancy and mechanical properties.

As described above, the flame retardant component of the present invention is prepared by adding 1 to 20 parts by weight of fine carbon powder to 100 parts by weight of composite metal hydroxide expressed by the general formula (1).

The fine carbon powder is dispersed into the polyolefin resin, and serves like a carbon-forming epitaxial substrate when burning, to effectively produce a carbonization promoting catalytic effect of transition metal in a solid solution state in the composite metal hydroxide, resulting in an extreme improvement in the carbonizing process of the resin.

Therefore, since required flame retardancy can be achieved by a small amount of the flame retardant, the physical properties, namely the mechanical properties, of the compound can be improved.

To add the flame retardant component to the resin, 60 to 150 parts by weight of the flame retardant component are added to 100 parts by weight of the resin. When the flame retardant component is less than 60 parts by weight, a flame-retarding effect is insufficient, and when it exceeds 150 parts by weight, the processability of the compound and the mechanical properties of the product are extremely lowered. The flame retardant component is preferably added in 80 to 150 parts by weight.

As described above, the flame retardant component of the invention has 1 to 20 parts by weight of fine carbon powder added to 100 parts by weight of the composite metal hydroxide. When the fine carbon powder is less than one part by weight, a sufficient flame-retarding effect cannot be attained, and when it exceeds 20 parts by weight, its physical properties are lowered. It is preferably in a range of 1 to 15 parts by weight.

By using the flame-retarding component consisting of the composite metal hydroxide and the fine carbon powder with respect to the polyolefin resin, the flame retardancy of the polyolefin compound can be improved extremely, and low smoking and low toxicity can also be achieved. In addition, the mechanical properties of the compound can be improved.

DESCRIPTION OF THE PREFERRED EMBODIMENTS

The present invention will be described in detail with reference to the following examples.

EXAMPLES 1-3

To prepare test samples, 0.2 part by weight of an age resistor and flame retardant components such as $Mg_{0.98}Ni_{0.02}(OH)_2$, $Mg_{0.95}Zn_{0.05}(OH)_2$ and fine carbon powder in amounts given in Table 1 were added to 100 parts by weight of low-density straight-chain polyethylene (hereinafter referred to as LLDPE); they were mixed in a blender, kneaded by biaxial rolls at 130° C., and press-molded at 160° C. into sheets having a thickness of 1 mm and a thickness of about 3.2 mm; and each sheet was pressed into the shape of a dumbbell and a strip. They were tested for a tensile test according to JIS C 3005 and a combustion test according to UL 94VE.

COMPARATIVE EXAMPLES 1-4

For comparison, comparative test samples were prepared and tested in the same way as in Examples 1-3 except that magnesium hydroxide ($Mg(OH)_2$) was used instead of the composite metal hydroxide in the flame retardant component in Examples 1-3.

Test results are shown in Table 2.

TABLE 1

|  | Examples | | | Comparative Examples | | | |
| --- | --- | --- | --- | --- | --- | --- | --- |
|  | 1 | 2 | 3 | 1 | 2 | 3 | 4 |
| LLDPE resin | 100 | 100 | 100 | 100 | 100 | 100 | 100 |
| Flame-retarding components |  |  |  |  |  |  |  |
| $Mg_{0.98}Ni_{0.02}(OH)_2$ | 90 | 100 |  |  |  |  |  |
| $Mg_{0.95}Zn_{0.05}(OH)_2$ |  |  | 100 |  |  |  |  |
| $Mg(OH)_2$ |  |  |  | 90 | 100 | 100 | 120 |
| Fine carbon powder | 6.25 | 4.0 | 6.25 | 6.25 | 6.25 | 4.0 | 6.25 |

TABLE 2

|  | Examples | | | Comparative Examples | | | |
| --- | --- | --- | --- | --- | --- | --- | --- |
| Tests | 1 | 2 | 3 | 1 | 2 | 3 | 4 |
| Flame retardancy UL 94VE | V-0 | V-0 | V-0 | B | B | B | V-0 |
| Tensile strength ($Kg/mm^2$) | 1.29 | 1.30 | 1.26 | 1.16 | 1.12 | 1.12 | 0.91 |
| Elongation (%) | 589 | 662 | 592 | 597 | 611 | 626 | 498 |

It is apparent from Table 2 that flame retardancy is extremely improved and a mechanical strength is also improved to a practical level by using the flame retardant component consisting of the composite metal hydroxide expressed by the general formula (1) and the fine carbon powder.

On the other hand, when metal hydroxide was used instead of the composite metal hydroxide and used together with the fine carbon powder in Comparative Examples, the required flame retardancy could not be attained in Comparative Example 1-3 in which the metal hydroxide was used in the same amount as the composite metal hydroxide in Examples 1-3.

In Comparative Example 4, the required flame retardancy could be attained by adding 120 parts by weight of metal hydroxide. But, mechanical properties were practically unsatisfactory because a tensile strength was 0.91 $Kg/mm^2$ and an elongation was 498%, insufficient to provide a required strength.

By adding a specified amount of the flame retardant component consisting of the composite metal hydroxide and the fine carbon powder to a halogen-free polyolefin resin, a sufficient flame retardancy could be attained even if the amount was smaller than a convention amount of the metal hydroxide, and low smoking and toxicity could be achieved. The amount of metal hydroxide could be reduced extremely, and the deterioration of mechanical properties involved in the addition of a large amount of hydroxide could be prevented extremely.

What is claimed is:

1. A flame retardant polyolefin compound having low smoking and toxicity which comprises 100 parts by weight of polyolefin resin and 60 to 150 parts by weight of a flame retardant component which is prepared by adding 1 to 20 parts by weight of fine carbon powder to 100 parts by weight of composite metal hydroxide expressed by the following general formula:

$$Mg_{1-x}M^{+2}_x(OH)_2$$

in which $M^{+2}$ is at least one element selected from the group consisting of bivalent metallic ions $Mn^{+2}$, $Fe^{+2}$, $Co^{+2}$, $Ni^{+2}$, $Cu^{+2}$ and $Zn^{+2}$, and x has a value satisfying $0.001 \leq x \leq 0.9$.

2. A flame retardant polyolefin compound having low smoking and toxicity according to claim 1, wherein said bivalent metallic ion $M^{+2}$ is at least one element selected from the group consisting of $Ni^{+2}$ and $Zn^{+2}$.

3. A flame retardant polyolefin compound having low smoking and toxicity according to claim 1, wherein said flame retardant component is added in 80 to 130 parts by weight.

4. A flame retardant polyolefin compound having low smoking and toxicity according to claim 2, wherein said flame retardant component is added in 80 to 130 parts by weight.

5. A flame retardant polyolefin compound having low smoking and toxicity according to claim 1, wherein said fine carbon powder is added in 1 to 15 parts by weight to 100 parts by weight of the composite metal hydroxide.

6. A flame retardant polyolefin compound having low smoking and toxicity according to claim 2, wherein said fine carbon powder is added in 1 to 15 parts by weight to 100 parts by weight of the composite metal hydroxide.

7. A flame retardant polyolefin compound having low smoking and toxicity according to claim 3, wherein said fine carbon powder is added in 1 to 15 parts by weight to 100 parts by weight of the composite metal hydroxide.

8. A flame retardant polyolefin compound having low smoking and toxicity according to claim 4, wherein said fine carbon powder is added in 1 to 15 parts by weight to 100 parts by weight of the composite metal hydroxide.

9. A flame retardant polyolefin compound having low smoking and toxicity according to claim 1 through 8, wherein said polyolefin resin is at least one member selected from the group consisting of polyethylene, polypropylene, ethylene-ethyl acrylate copolymer and ethylene-vinyl acetate copolymer.

* * * * *

UNITED STATES PATENT AND TRADEMARK OFFICE
CERTIFICATE OF CORRECTION

PATENT NO. : 5,654,356

DATED : August 5, 1997

INVENTOR(S): Yukihiko NAMIKI et al.

It is certified that an error appears in the above-identified patent and that said Letters Patent is hereby corrected as shown below:

On the title page, [57] Abstract, first line, "polofin" should read --polyolefin--.

Column 1, line 63, delete "than".

Column 4, line 8, "convention" should read --conventional--.

Signed and Sealed this

Eighth Day of June, 1999

Attest:

Q. TODD DICKINSON

Attesting Officer

Acting Commissioner of Patents and Trademarks